United States Patent
Cunningham et al.

(10) Patent No.: US 7,334,702 B2
(45) Date of Patent: Feb. 26, 2008

(54) TAMPER RESISTANT BEVERAGE DISPENSING BAG

(75) Inventors: Daniel A. Cunningham, Indianapolis, IN (US); Richard W. Smith, Indianapolis, IN (US)

(73) Assignee: Parish Manufacturing, Inc., Indianapolis, IN (US)

( * ) Notice: Subject to any disclaimer, the term of this patent is extended or adjusted under 35 U.S.C. 154(b) by 2 days.

(21) Appl. No.: 11/055,229

(22) Filed: Feb. 10, 2005

(65) Prior Publication Data

US 2005/0145649 A1 Jul. 7, 2005

Related U.S. Application Data

(62) Division of application No. 10/423,660, filed on Apr. 25, 2003, now Pat. No. 6,883,683.

(51) Int. Cl.
*B65D 35/56* (2006.01)

(52) U.S. Cl. .................. 222/1; 222/105; 222/131; 383/41; 383/210; 383/906

(58) Field of Classification Search .............. 222/1, 222/92, 105, 131; 383/4, 906, 210, 211
See application file for complete search history.

(56) References Cited

U.S. PATENT DOCUMENTS

| | | | |
|---|---|---|---|
| 2,377,261 A | 5/1945 | Norris | |
| 2,861,718 A | 11/1958 | Winzen | |
| 2,867,298 A | 1/1959 | Roder | |
| 3,096,912 A | 7/1963 | Rivette | |
| 3,976,277 A | 8/1976 | Basel et al. | |
| 4,037,817 A | 7/1977 | Chernak | |
| 4,044,989 A | 8/1977 | Basel et al. | |
| 4,095,470 A | 6/1978 | Sliger | |
| 4,113,146 A | 9/1978 | Williamson | |
| 4,516,693 A * | 5/1985 | Gaston | 222/105 |
| 4,976,381 A | 12/1990 | Scholle et al. | |
| 5,609,195 A | 3/1997 | Stricklin et al. | |
| 5,702,092 A | 12/1997 | Farris et al. | |
| 5,797,524 A | 8/1998 | Lentz | |
| 5,816,298 A | 10/1998 | Stricklin et al. | |

(Continued)

*Primary Examiner*—J. Casimer Jacyna
(74) *Attorney, Agent, or Firm*—Woodard, Emhardt, Moriarty, McNett & Henry LLP

(57) ABSTRACT

A method for dispensing a liquid includes providing a container having a top, a bottom, a first opening at the top and a second opening proximal the bottom; providing a liquid dispensing bag including a flexible pouch having a top, a bottom, and first and second panels, the first and second panels defining an interior and a first opening to the interior at the bag top, wherein at least one of the first and second panels defines a second opening to the interior near the bag bottom, and wherein the bag further includes liquid dispensing apparatus including a tube connected to the pouch to permit a controlled flow of liquid from the second opening of the pouch, and wherein the first and second panels are connected together at the pouch top to releasably close the first pouch opening. The first pouch opening is opening by separating the first and second panels from each other at the top of the pouch, and the bag is positioned in the container with the tube extending out through the second opening of the container. Liquid is inserted into the bag interior, and liquid dispensing apparatus is actuated to selectively release the liquid out through the tube.

17 Claims, 10 Drawing Sheets

U.S. PATENT DOCUMENTS

| | | |
|---|---|---|
| 5,884,648 A | 3/1999 | Savage |
| 5,904,425 A * | 5/1999 | May .......................... 383/203 |
| 5,702,092 A | 7/2000 | Farris et al. |
| 6,116,467 A * | 9/2000 | Petriekis et al. ............ 222/105 |
| 6,131,767 A | 10/2000 | Savage et al. |
| 6,138,878 A | 10/2000 | Savage et al. |
| 6,296,157 B1 | 10/2001 | Erb |
| 6,305,437 B1 | 10/2001 | Edwards et al. |
| 6,338,370 B1 | 1/2002 | Edwards et al. |
| 6,360,925 B2 | 3/2002 | Erb |
| 6,371,646 B1 | 4/2002 | LaFleur |
| 6,644,854 B2 | 11/2003 | Lien |

* cited by examiner

TAMPER RESISTANT BEVERAGE DISPENSING BAG

REFERENCE TO RELATED APPLICATION

The present invention is a divisional application of U.S. patent application Ser. No. 10/423,660, filed Apr. 25, 2003 now U.S. Pat. No. 6,883,683.

FIELD OF THE INVENTION

The present invention relates to beverage dispensing systems, and more particularly, to systems using plastic liners disposed within beverage dispensing containers.

BACKGROUND OF THE INVENTION

Beverage dispensing in group environments, such as in restaurants, nursing homes dormitories and the like, have in the past included the use of a large container made of metal, plastic or glass. The beverage, such as milk, tea, juice, etc., was dispensed directly from the container through a spout or spigot located at the bottom of the container. Problems involved in maintaining proper sanitation between uses are well known and prompted the development of container liners. Typical of such liners include a bag or pouch, open at its top and having a spout at its bottom. The bag is disposed in the beverage container whereby the spout is extended through an opening in the bottom of the container. The height of the bag exceeds that of the container so that the open top of the bag may be folded over the upper edges of the container top. Alternatively, after the bag is filled with a beverage, the open top portion of the bag can be gathered together and secured from re-opening with a device such as a self-locking nylon cable tie. The bottom of the bag rests on the bottom of the container. The beverage is then poured into the now bag-lined container, and a lid is positioned over the top of the container and the folded-over bag. Release of the beverage through the spout is controlled by a valve mechanism connected either to the spout itself or to the container. In the latter case, the spout includes a typically flexible tube that extends through the flow control or valve mechanism, and the valve mechanism is operable to releasably pinch the tube to control the beverage flow. Such systems have been in wide use since at least the 1960's and are described and shown in various forms in the following U.S. Pat. Nos. 2,861,718; 3,096,912; 3,976,277; 4,516,693; 5,516,693; 5,797,524; and, 6,116,467, all of which are hereby incorporated by reference. With the bag lining the container and the beverage release area, the sanitation issues have thus been substantially shifted from the container to the bag. Adherence to good manufacturing practices (GMP) during manufacture, transport and handling of the bags provides a high level of sanitation, but improvements are always desired.

SUMMARY OF THE INVENTION

Generally speaking, the present invention provides a tamper resistant beverage dispensing bag for use in beverage dispensing containers and the like.

A tamper resistant beverage dispensing bag comprises a flexible pouch having a top and a bottom and defining a first opening at the top and a second opening near the bottom. The pouch has a top edge defining the first opening, and the first opening is releasably closed proximal to the top edge by a tack seal that can be manually pulled apart to open the first opening, by a perforated line that defines a tear strip that can be manually torn away to open the first opening, or by other similar configurations. A liquid dispensing apparatus, such as a fitting and tube combination, is connected to the pouch at the second opening to permit the controlled flow of liquid from the pouch.

It is an object of the present invention to provide an improved beverage dispensing bag or liner for use in beverage dispensing containers.

Other objects and advantages will become apparent from the following description of the preferred embodiment.

DESCRIPTION OF THE PREFERRED EMBODIMENT

Figure 1:
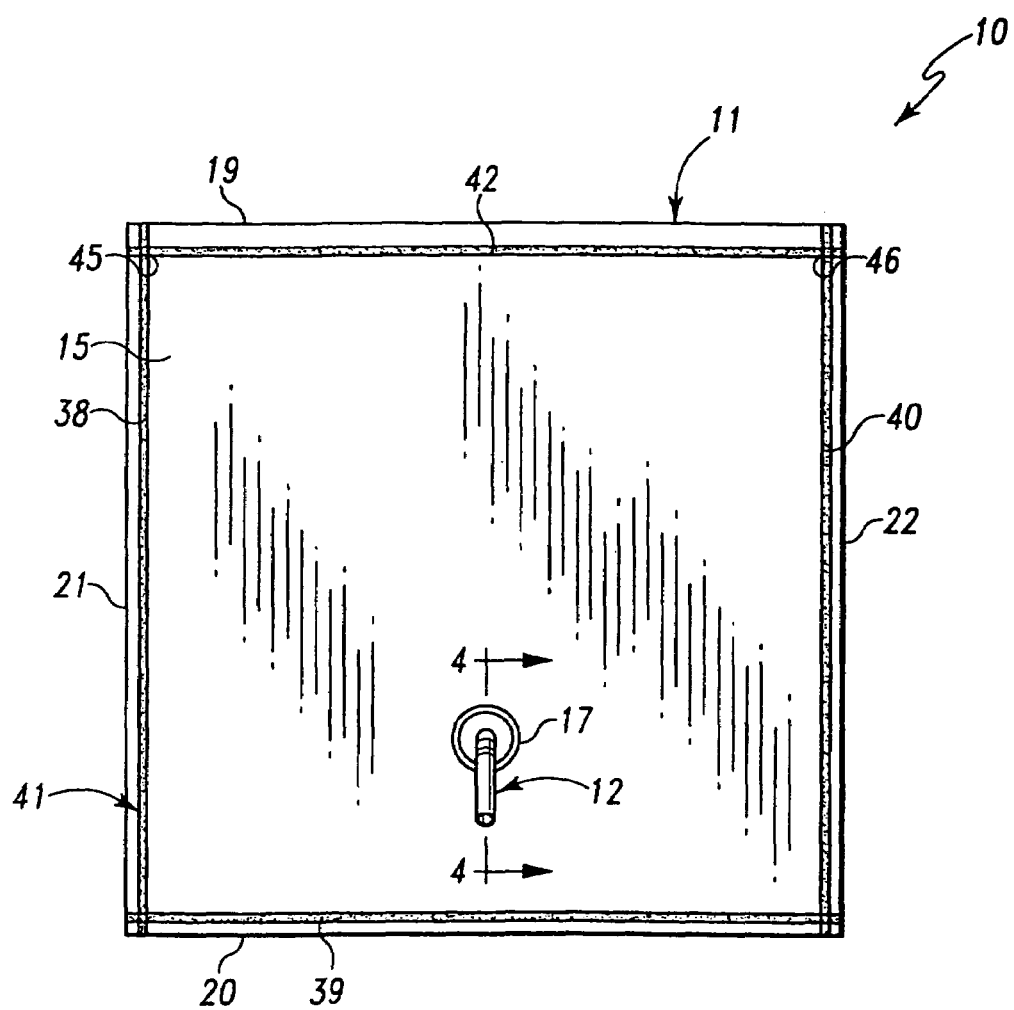
FIG. 1 is a front, elevational view of a tamper resistant beverage dispensing bag assembly 10 in accordance with one embodiment of the present invention.
Figure 2:
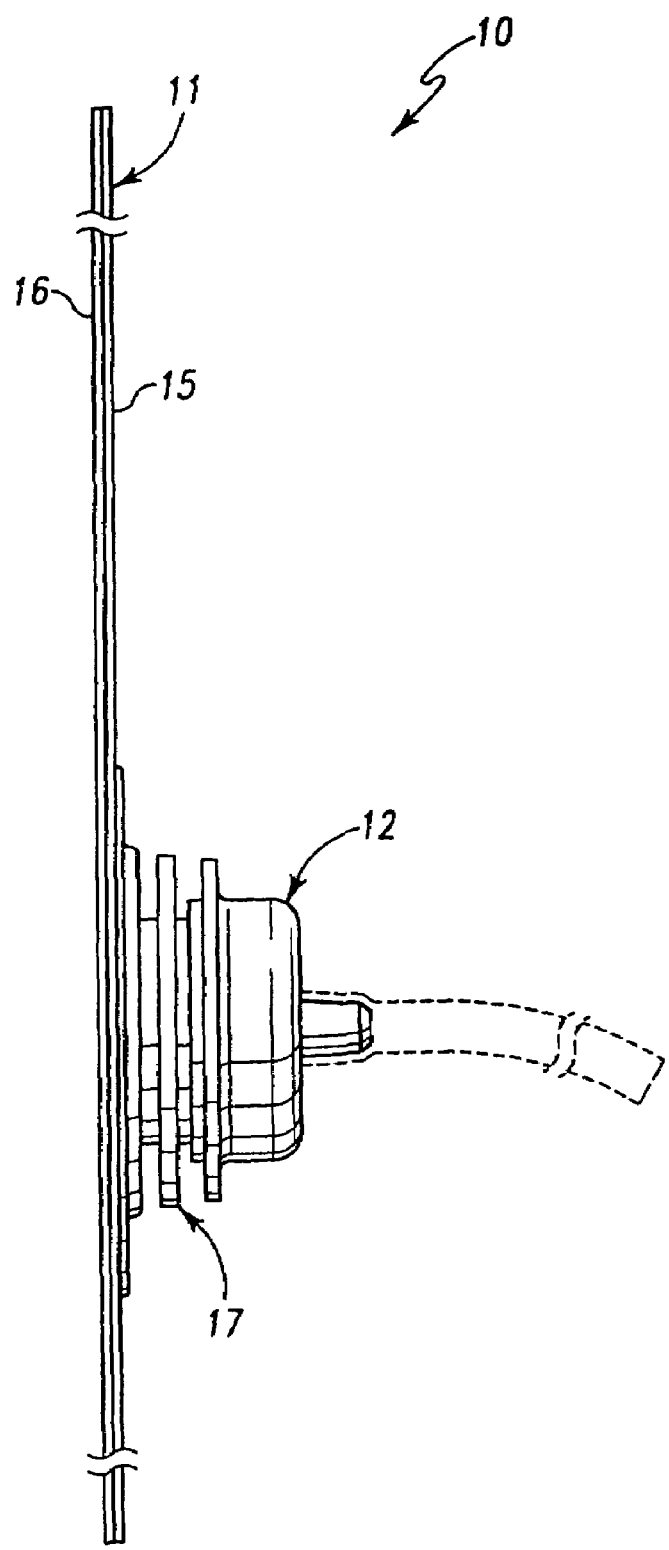
FIG. 2 is a side, elevational view of the bag assembly 10 of FIG. 1 and showing the tube apparatus 12.

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations or modifications in the illustrated device, and any further applications of the principles of the invention as illustrated therein are contemplated as would normally occur to one skilled in the art to which the invention relates.

Referring to FIGS. 1-4, there is shown a tamper resistant beverage dispensing bag assembly 10 in accordance with one embodiment of the present invention. Bag assembly 10 generally comprises a flexible and disposable bag 11 and a dispensing conduit or tube apparatus 12. Bag 11 comprises front and back panels 15 and 16 and a fitting 17. Each panel has a top 19, a bottom 20 and opposing side edges 21 and 22. Front panel 15 defines an opening 25 near the bottom 20. Fitting 17 includes a central cylindrical portion 26, a rear, radially extending annular flange 27, and a central, radially extending flange 28, and defines a central passageway 29 extending therethrough. (For purposes of discussion, dimensions are exaggerated somewhat to facilitate description. For example, panels 15 and 16 are in one embodiment 4 mils thick, while flange 28 is about 0.05 inches thick. The relative dimensions of fitting 17, as well as panels 15 and 16 and tube apparatus 12, are selected to optimize various manufacturing and use factors such as cost, weight, strength, heat tolerance and ease of manipulation). Rear flange 27 is sealingly connected to the inner (or outer) surface of front panel 15 by appropriate means such as by application of heat and pressure or by ultrasonic welding so that central cylindrical portion 26 extends through and outwardly from opening 25, and so that central passageway 29 is aligned with opening 25, is in communication with the space between panels 15 and 16, and extends generally perpendicularly from panel 11, as shown. Forwardly of flange 28, central portion 26 includes first and second annular recesses 31 and 32. First recess 31 is sized large enough to receive a locking ridge of a tube assembly (12), and recesses 31 and 32 are shaped to define first and second rearwardly sloping locking flanges 33 and 34. Fitting 17 is made of any suitable somewhat rigid plastic, such as polyethylene.

Panels 15 and 16 are made of a suitable flexible plastic that is capable of being joined together as by heat and pressure sealing and is capable of withstanding boiling hot liquids such as tea. In one embodiment, panels 15 and 16 are made of a low density polyethylene having a melt softening point greater than 175°. Other embodiments are contemplated, however, wherein panels 15 and 16 comprise any suitable plastic having the qualities described herein and being able to withstand whatever temperatures or stresses are contemplated by the liquid for which the bag is intended. Panels 15 and 16 are of identical size and shape and are permanently joined together proximal to the bottom 20 and side edges 21 and 22 by creation of appropriate, seal strips 38-40 by any suitable method such as heat and pressure welding or ultrasonic welding, both of which are well known in the art. The side seal strips 38 and 40 intersect with the bottom seal strip 40 to form a generally continuous U-shaped seal 41. The resulting configuration forms a pouch or bag 11, open at its top 19 and capable of receiving and holding liquid beverages in a wide temperature range.

Bag 11 is further provided with a tamper-evident seal 42 proximal its top 19 and extending between and intersecting the upper ends of continuous seal 41 at points 45 and 46. Seal 42 is a tack seal. That is, a machine applies a certain amount of heat and pressure at the desired seal site (42) sufficient to releasably connect or bind panels 15 and 16 together thereat. Such connection or binding is more than inherent adherence between panels 15 and 16; it is the intentional creation of a mechanical connection between panels 15 and 16. The heat and pressure combination to form seal 42 is strong enough to bind and hold panels 15 and 16 together during normal manipulation of bag 11 (i.e. packing, shipping, unpacking, routine handling, etc). Conversely, tack seal 42 does not permanently weld panels 15 and 16 together thereat—they may be manually pulled apart when desired, as shown at 47 in FIG. 3 where panels 15 and 16 are started to be pulled apart at the central portion of the upper edge 19. Once tack seal 42 is broken (as at 47), the pulled apart portion of panels 15 and 16 at 47 will not naturally reconnect. That is, there will not be any significant natural adherence between panels 15 and 16 at any pulled apart region 47, and it will be readily apparent that the tack seal has been broken and that the integrity of the bag has been compromised. Such release of tack seal 42 will thus be readily detectable by pulling panels 15 and 16 apart at the bag top 19 and feeling no significant resistance. Such release of tack seal 42 will also likely be visually detectable in that the seal line will look different (i.e. a different shade) than other non-compromised tack seals 42. Alternative embodiments are contemplated wherein the tack seal appears as a particular color, and breaking or releasing the tack seal as by pulling it apart changes the color at the seal line. Such color-coded tamper evidency is disclosed more fully below.

Figure 4:
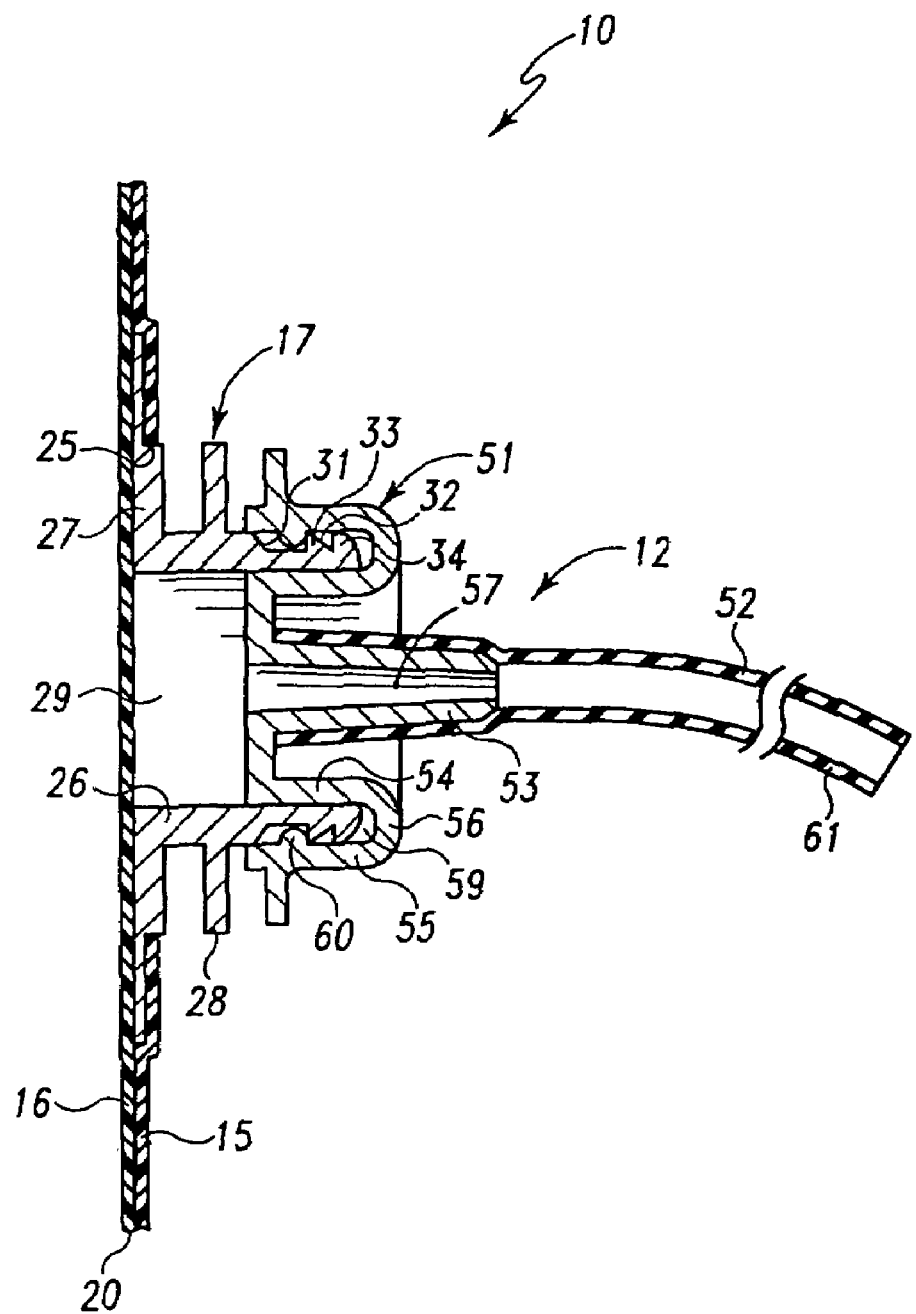
FIG. 4 is a side, cross-sectional view of the bag 11 of bag assembly 10 of FIG. 1 taken along the lines 4-4 and viewed in the direction of the arrows.

Dispensing conduit 12 comprises a connector 51 and a tube 52. Connector 51 is an integrally formed, axially symmetric member that has a central nipple 53, a inner cup 54, an outer cup 55 and a forward crown 56 that connects inner and outer cups 54 and 55. Nipple 53 defines a central passageway 57 therethrough. Cups 54 and 55 and crown 56 together define a rearwardly opening, cylindrical recess 59, and outer cup 55 includes an annular ridge 60 that extends radially inwardly into recess 59, as shown in FIG. 4. Recess 59 and ridge 60 are sized and shaped to receive the outboard end of central cylindrical portion 26 therein, wherein annular ridge 60 rides over at least the second locking flange 34 to seat and removably lock within second recess 32, and preferably over first locking flange 33 to seat and lock within first recess 31, as shown. The tolerances between central cylindrical portion 26 and connector 51 are such that, when connector 51 is pushed onto fitting 17 and annular ridge 60 seats within recess 31, a substantially fluid-tight seal is achieved between fitting 17 and connector 51. Tube 52 is a flexible tube of any suitable elastomer as is generally known in the art and is pressure fitted over nipple 53, as shown, to provide fluid communication from between panels 15 and 16 (inside of the bag), through opening 25, central passageway 29, nipple 53 and into tube 52.

Figure 3:
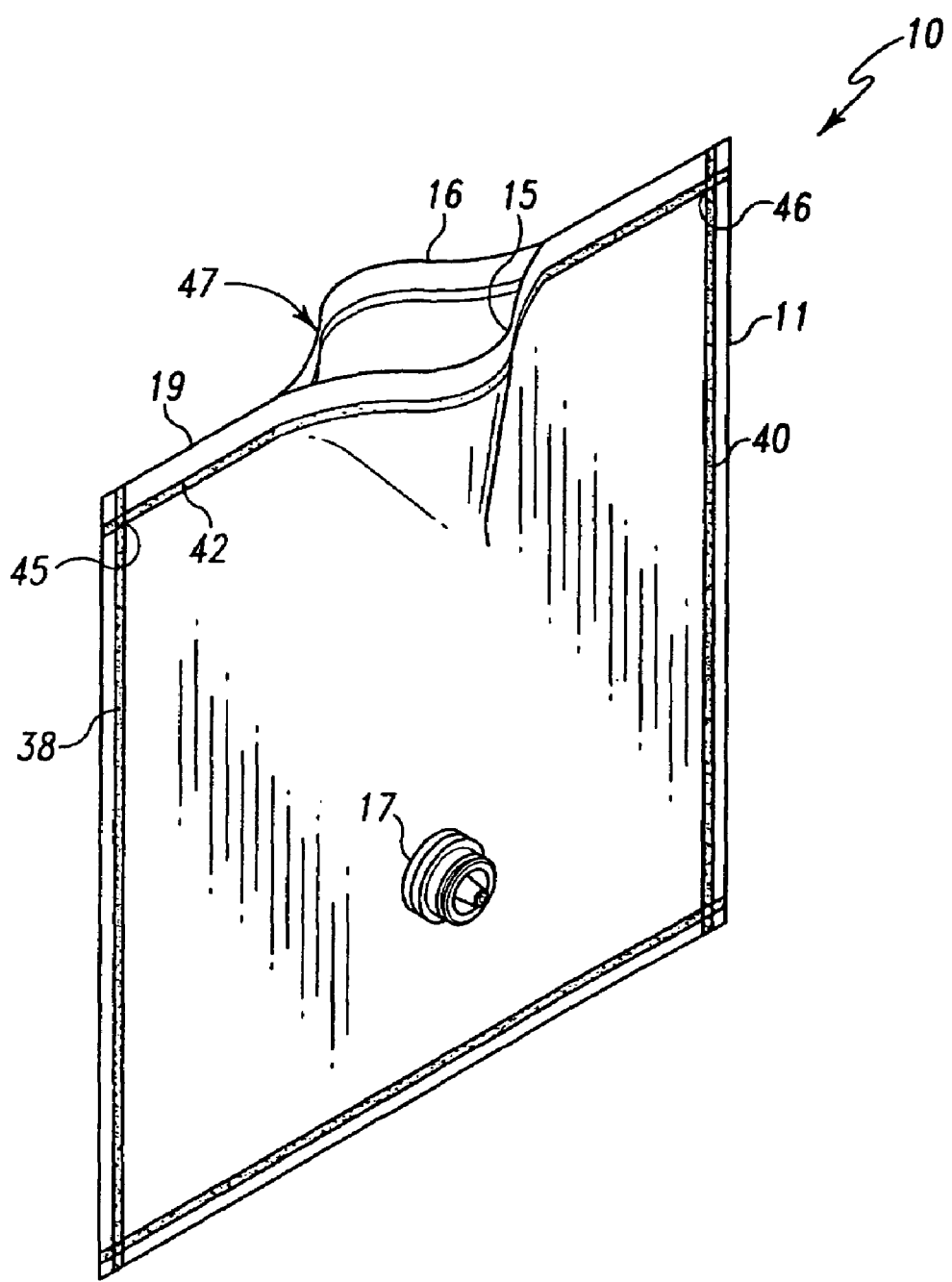
FIG. 3 is a front, perspective view of the bag 11 of bag assembly 10 of FIG. 1 and shown in the partially opened condition.
Figure 11:
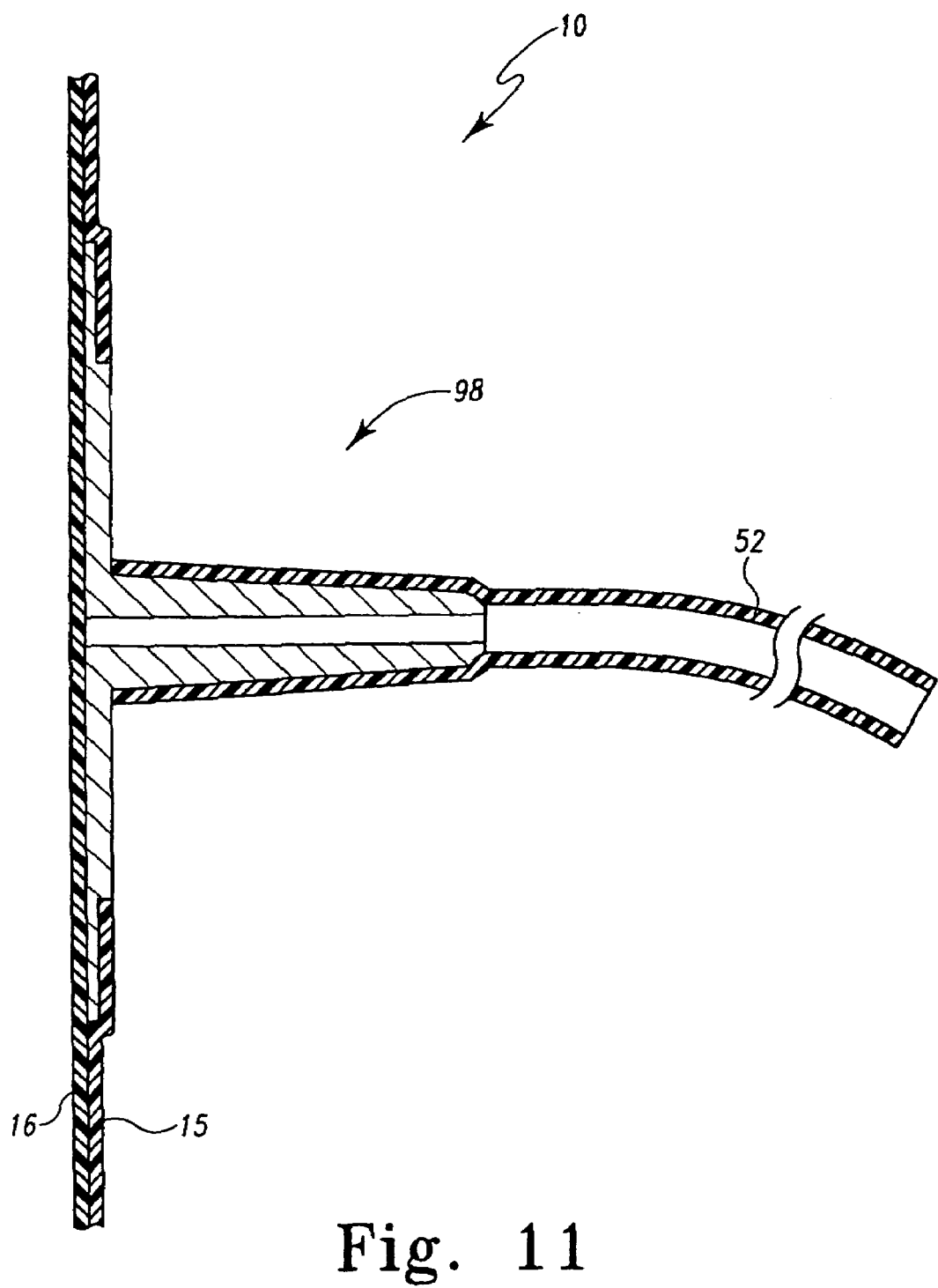
FIG. 11 is a side, cross-sectional view of the bag 11 of FIG. 4, but showing an alternative configuration for connecting a tube apparatus to the bag and including a single, homogeneous fitment 98 bonded to panel 15.
Figure 13:
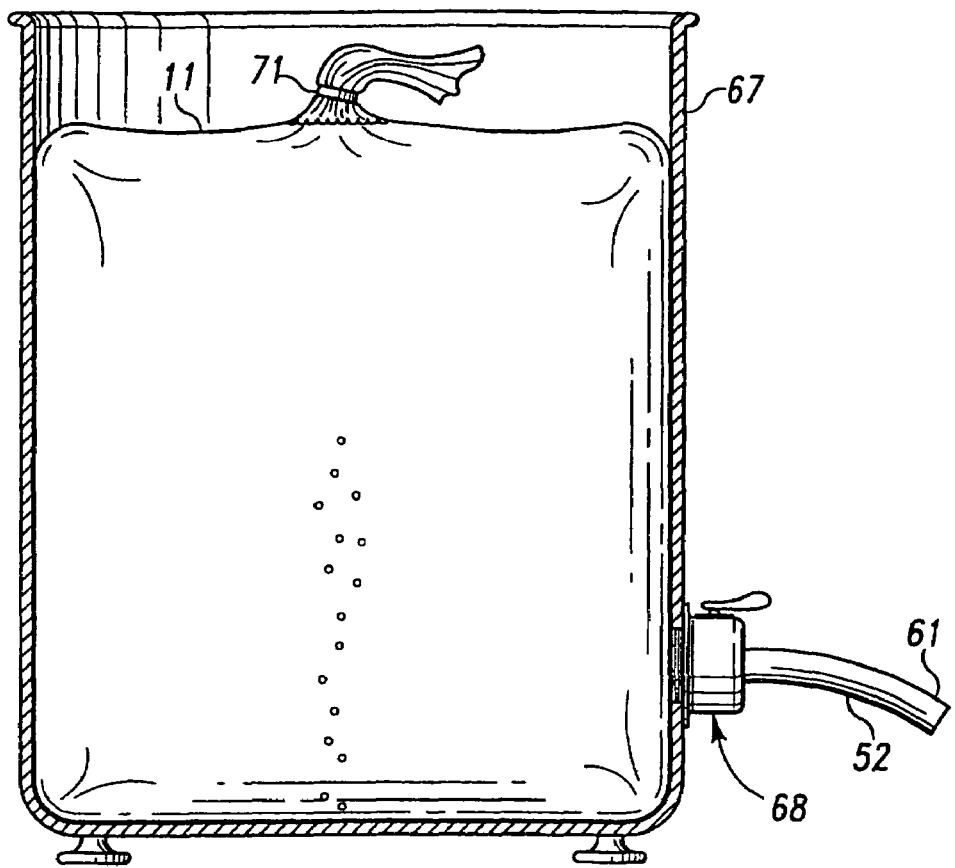
FIG. 13 is a side, elevational view of the bag 11 of FIG. 1, disposed in a liquid beverage container and filled with a liquid beverage, and with the container shown in cross-section.

In use, referring to FIGS. 3 and 13, the user selects a new bag 11 and, grasping the upper edges of panels 15 and 16, pulls them apart all the way out to intersection points 45 and 46 (at seal strips 38 and 40), thereby breaking tack seal 42 and completely opening bag 11 at its top 19. In one embodiment, tube apparatus 12 is pre-assembled onto fitting 17 so that the user may then dispose the fully assembled and opened bag 11 down into the desired beverage container 67 and extend the distal end 61 of connected tube 52 through the corresponding opening and flow control or valve mechanism 68 at the bottom of container 67, as is commonly known. Container valve port assembly 68 may be any suitable apparatus that receives the tube 52 therethrough and is operable to selectively open and close the flow of liquid through tube 52. Such flow control apparatuses have been in use for many years, examples of which are shown in U.S. Pat. Nos. 3,976,277, 5,516,693 and 5,797,524. Alternatively, instead of being connected to the container 67, the flow control device (not shown) could be connected directly to the connector 51 or tube 52 (to selectively control fluid flow through tube 52), and the connector with tube and flow control device then extend through and outwardly from a suitably shaped opening in a substantially rigid container (not shown). Embodiments are also contemplated where some or the entire portion of the connector, tube and flow control device reside inside the container and operate to dispense the liquid from the bag and through an opening in the container. Alternatively, connector 51 could comprise the flow control or valving mechanism, and a tube could or could not be connected thereto to extend or direct the flow output farther away from the bag. Such systems are also well known having been in use for many years. Alternatively, the flow control device (not shown) may be connected directly to a combination of fitting 17 and connector 51, as shown at 98 in FIG. 11 and described herein, or to the tube connected to connector 51. The beverage container 67 is contemplated to be any suitable structure sized, shaped and of sufficient rigidity to hold the liquid filled bag and permit dispensing of the liquid contents from such bag, as desired. Alternative embodiments also include the container being suspended rather than sitting on a surface, in which case the container could be rigid, semi-rigid or flexible, with some appropriate mechanism or structure enabling its suspension.

After positionment of bag 11 in the container 67 and its tube 52 through the container's flow control apparatus 68, the open top of the bag 11 is folded over the upper edges of the container top, at which time an elastic band or similar device may be applied to secure the top of the bag in place. The bottom of the bag rests on the bottom of the container. The beverage is then poured into the now bag-lined container, a lid is positioned over the top of the container and the folded-over bag, and the bag-lined container is ready for service. Alternatively, at shown in FIG. 13, after the bag is filled with a beverage, the open top portion of the bag can be gathered together and secured from re-opening with a device such as a self-locking nylon cable tie 71.

Figure 5:
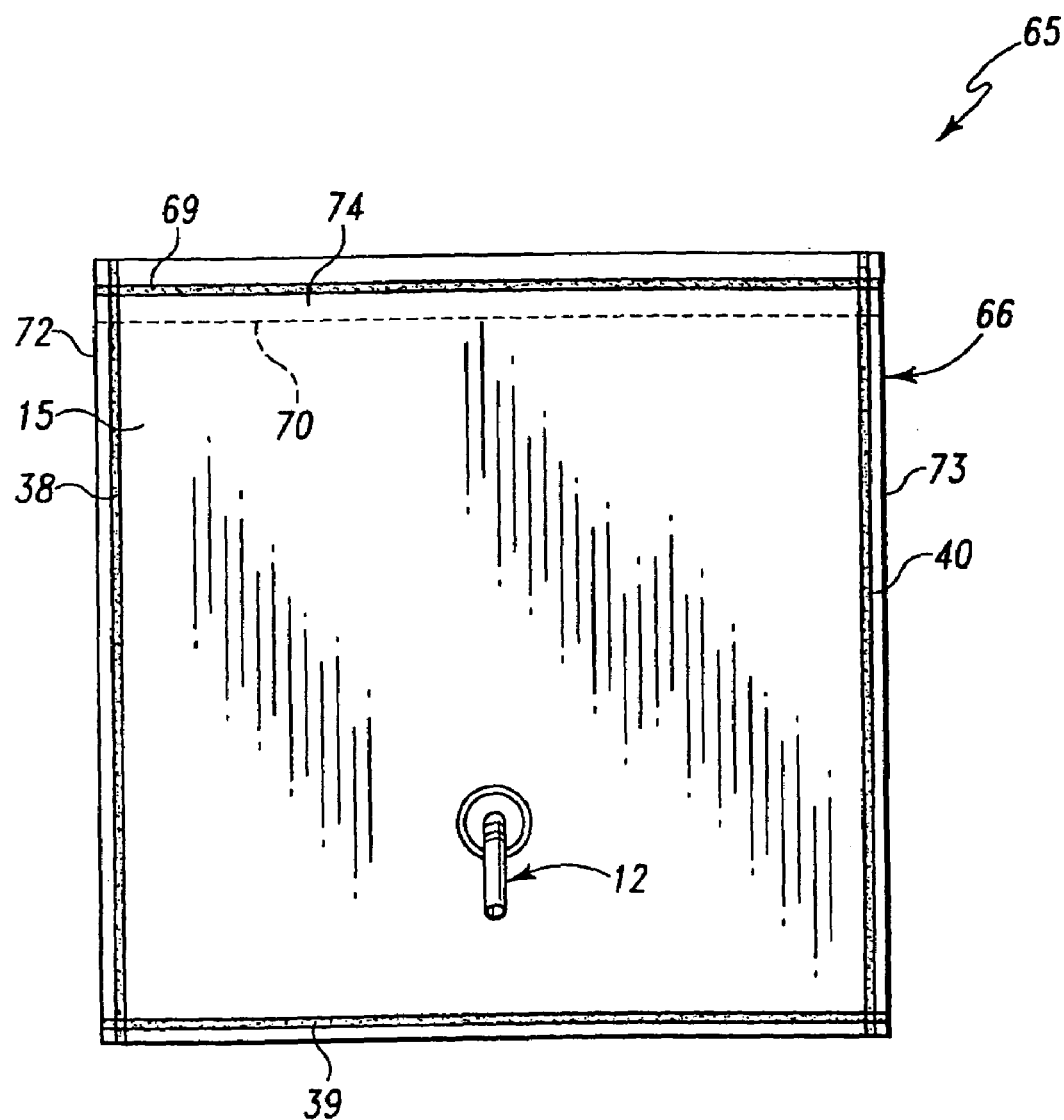
FIG. 5 is a front, elevational view of a bag assembly 65 in accordance with another embodiment of the present invention.

Referring to FIG. 5, there is shown a tamper resistant beverage dispensing bag assembly 65 in accordance with another embodiment of the present invention. Bag assembly 65 is substantially identical to bag assembly 10, and like reference numbers will be used in the description of bag assembly 65, where appropriate, to describe like elements. Like bag assembly 10, bag assembly 65 includes a bag 66, which is identical to bag 11 except that the tack seal 42 of bag 10 is replaced with a seal strip 69 that permanently seals the top of bag 66, just like at the seal strips 38-40 at the sides and bottom of the bag. In addition, a perforation line 70 is created just below seal strip 69 and all the way across the width of bag 66. Perforation line 70 is created by appropriate means to at least weaken, and at most perforate, short, alternating segments along a continuous line from one edge 72 to the other, opposing edge 73, thus creating a tear strip 74 at the top of bag 66. To open bag 66, the tear strip 74 is pulled generally upwardly from the rest of bag 66 whereby tear strip 74 pulls away from and completely separates from the rest of bag 66 along perforation line 70, thereby permitting the panels 15 and 16 to be freely pulled apart at perforation line 70.

Figure 6:
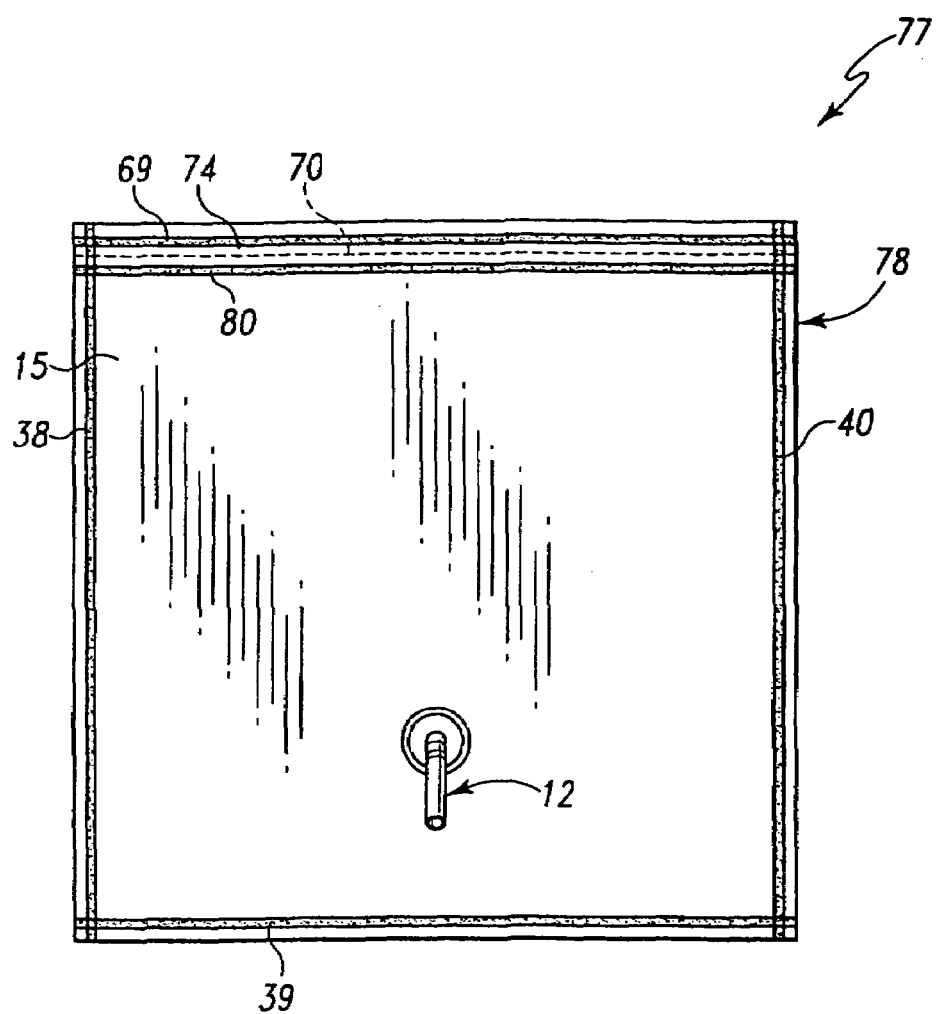
FIG. 6 is a front, elevational view of a bag assembly 77 in accordance with another embodiment of the present invention.

Referring to FIG. 6, there is shown a tamper resistant beverage dispensing bag assembly 77 in accordance with another embodiment of the present invention. Bag assembly 77 is substantially identical to bag assembly 65, and like reference numbers will be used in the description of bag assembly 77, where appropriate, to describe like elements. Like bag assembly 65, bag assembly 77 includes a bag 78, which is identical to bag 66 except that a tack seal 80 is provided just below the perforation line 70. Thus, bag 78 is opened by pulling and completely separating tear strip 74 away from the rest of bag 78 along perforation line 70, thereby permitting the panels 15 and 16 to be pulled apart at perforation line 70 to then open the tack seal 80, just as described above to open the tack seal 42 of bag 11 (FIG. 3).

Figure 7:
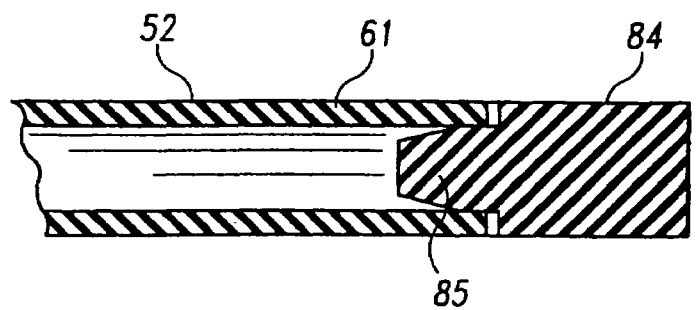
FIG. 7 is a side, cross-sectional view of the distal end 61 of tube 52 of bag 11.
Figure 8:
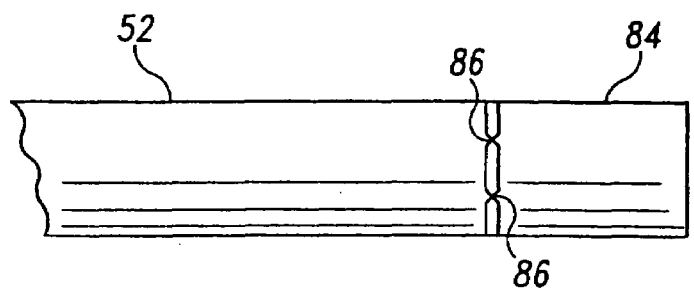
FIG. 8 is a side, elevational view of the tube end 61 of FIG. 7.

Referring to FIGS. 7 and 8, further tamper resistant protection may be afforded to the distal end 61 of tube 52 by a closing element that in a plug 84 with a protrusion 85 that extends snugly into the open distal end 61. A series of weak, but visible connections 86 are created during manufacture of tube 52 between the plug 84 and tube end 61. To remove plug 84, it must be pulled relative to tube end 61 whereby connections 86 are broken, and plug 84 may then be freely pulled away from tube end 61. If upon initial inspection at first use of tube 52, one or more of connections 86 are broken, the user may suspect tampering and reject that tube (and bag, if connected) in favor of one that has not been tampered with or otherwise compromised.

Figure 9:
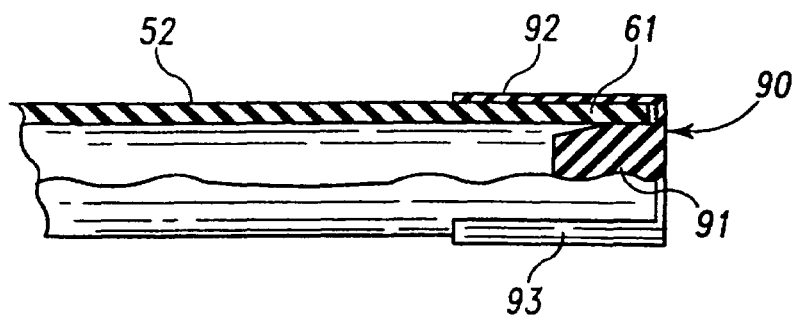
FIG. 9 is a side, elevational view of the distal end 61 of tube 52 and showing a plug 90 in accordance with another embodiment of the present invention.

Referring to FIG. 9, there is shown tube 52 and a closing element in a plug 90 in accordance with an alternative embodiment of the present invention. Plug 90 includes a protrusion 91 that extends within the open distal end 61. Plug 90 further includes a pair of flexible wings 92 and 93 of the type that are commonly used on medical devices and on music and video disc containers. Such wings are made of an adhesive backed paper, foil or the like and, upon initially pulling them away from the outer surface of distal end 61, they will tear apart rather then pull away in a whole condition. The user can thus easily discern if one or both of wings 92 and 93 have been tampered with.

Figure 10:
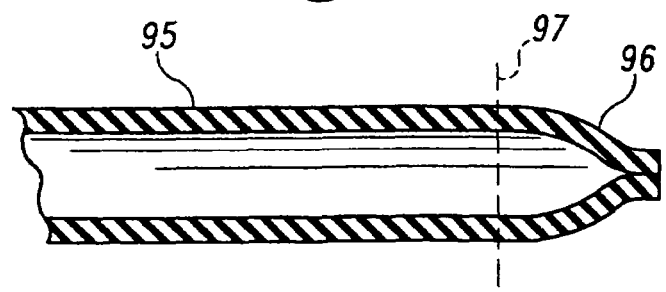
FIG. 10 is a side, elevational view of the end of a tube 95 in accordance with another embodiment of the present invention.

Referring to FIG. 10, there is shown a tube 95 in accordance with an alternative embodiment of the present invention where the closing element to make tube 95 tamper resistant is the distal end 96 itself of tube 95. That is, the distal end 96 is physically closed off as by applying heat and a pinching force thereat to seal the end closed. When ready for use, tube 95 is opened by cutting the closed end 96 off, as at 97.

Alternative embodiments are contemplated wherein the tube assembly is not connected with the bag, and tamper evident caps, tabs, covers, lids plugs and the like are provided to both ends of the tube assembly 12 and/or to fitting 17, in the same or similar manner as described herein with reference to the distal end 61 of tube 52.

Figure 12:
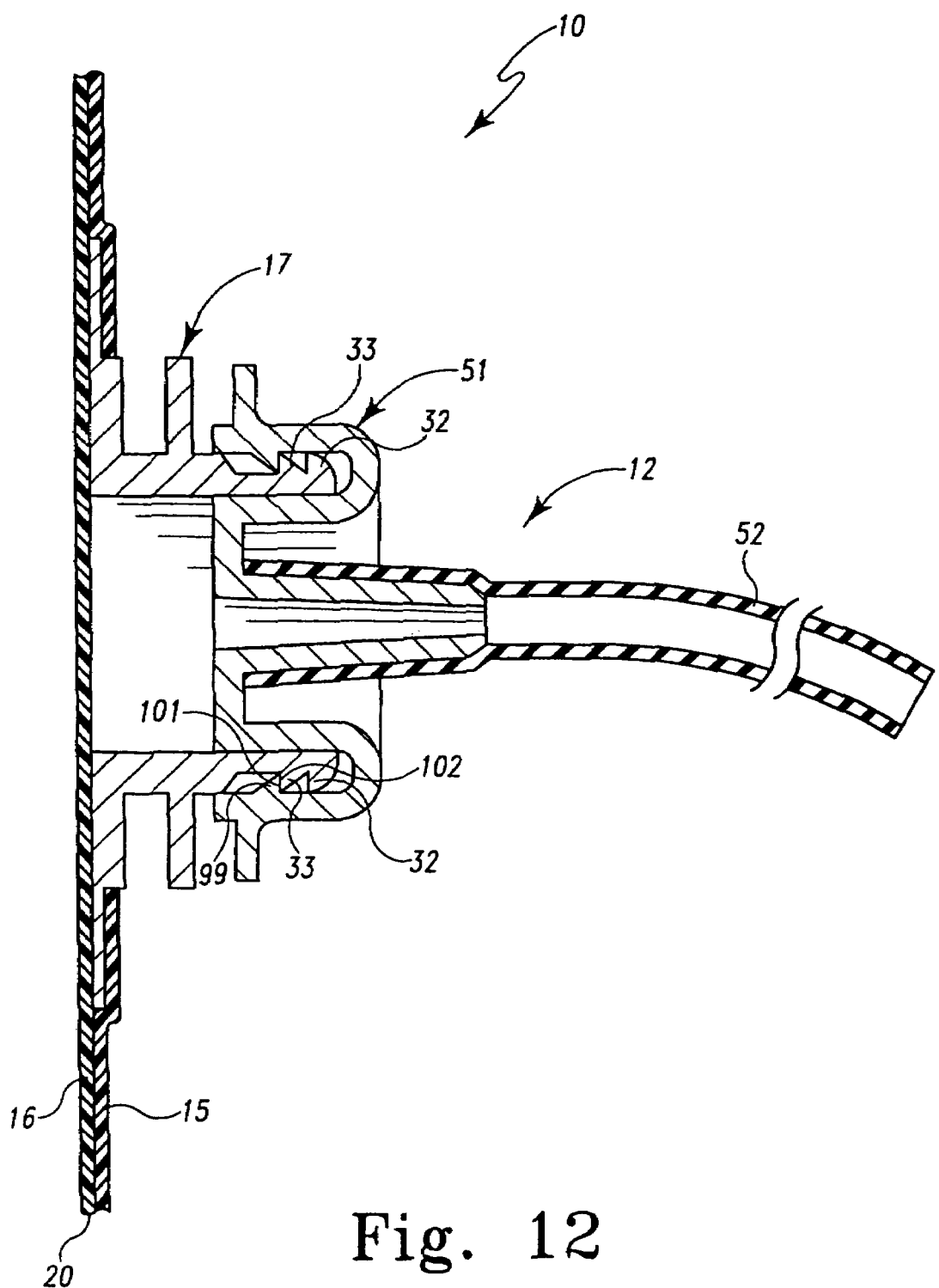
FIG. 12 is a side, cross-sectional view of the bag 11 of FIG. 4, but showing an alternative structure for essentially permanently connecting dispensing conduit 12 to fitting 17.

Alternative embodiments are contemplated where tube apparatus 12 is configured for connection to bag 11 in other suitable manners to permit the dispensing of liquid from within bag 11. For example, and without limitation, tube apparatus 12 may be screwed onto a complementary shaped fitting connected to bag 11. Alternative embodiments are contemplated wherein the tube assembly is permanently connected with the bag. For example and referring to FIG. 4, dispensing conduit 12 may be fixedly bonded to connector 51 with an adhesive or heat bonding. Alternatively and referring to FIG. 11, dispensing conduit 12 and connector 51 may be integrally formed, that is, comprising one homogeneous fitment 98 that is bonded to front panel 15 as described herein for just connector 51, and to which tube 52 is connected. Alternatively and referring to FIG. 12, dispensing conduit 12 may include structure that permits assembly, but not disassembly, thereby essentially permanently locking it to fitting 17. For example, and without limitation, rounded, annular ridge 60 may be shaped instead as a forwardly sloping locking flange 99, as shown, that permits connector 51 to be advanced onto fitting 17, but not off. Thus, as the sloping surface of locking flange 99 rides over the corresponding sloping surfaces of locking flange 32 and then locking flange 33, the vertical faces 101 and 102 of flanges 33 and 99, respectively, engage and preclude connector 51 from being pulled back and away from fitting 17. In this embodiment, any structure that permits connector 51 to be non-removably connected to fitting 17 is contemplated.

The bags herein have been described as being formed by two pieces of plastic permanently bonded together along at least three sides to create a pouch that is open at the top. Alternative embodiments are contemplated wherein the bag is made of any material suitable for the liquid that is intended to be deposited in and dispensed from the bag. Alternative embodiments are contemplated wherein the bag is constructed in any manner and in any shape that produces a pouch having an openable top so that the bag may be deposited down inside of a desired liquid dispensing container. For example, and without limitation, the bag could be formed from continuous plastic in tubular form that is cut to length and then permanently bonded just at the bottom, the sides already being joined together.

Alternative embodiments are contemplated wherein the beverage dispensing bag comes already filled with a portion or all of the beverage. For example, and without limitation, the bag may come sealed at the top with the tack seal, perforation seal, both tack and perforation seal or some other openable seal at the top, as described herein, and such bag could also contain a concentrated dry, liquid or solid premix. In such case, the bag can be deposited in a more rigid container or receptacle; the tear strip 74 can be removed; the upper portions of the bag folded over or otherwise secured to the container; and, one or more additional ingredients (i.e. water) can be admixed to the premix to form the finished beverage.

The bags described herein have included a tack seal 42 (FIG. 1), a perforation line 70 with strip seal 69 (FIG. 5), and both tack seal 80 and combination perforation line 70 and strip seal 69 (FIG. 6). Alternative embodiments are contemplated where the top of the bag is made tamper-evident by other appropriate means such as, but without limitation: an adhesive to initially hold the upper edges of the panels 15 and 16 together, or an external member, separate from the panels 15 and 16, adhesively and/or fixedly connected to one or both of the panels. Alternative embodiments are also contemplated wherein a tamper-evident tack seal may be provided by the use of two different color films that display a third color at the sealing line thereof (i.e. along the line at 42 in FIG. 1) until the tack seal is broken, at which time both films display their original colors or, at least, a color different than the original tack seal color. Attempts to press the two films back together to recreate the original color will be unsuccessful as no significant adhesion will be possible at the original tack seal site, and the smooth colored line original at the tack seal site will not be able to be recreated. Such result will be inherent in the use of the two, different colored films and from the heat and pressure application to create the tack seal. An almost infinite variety of color combinations are available, but colors should be chosen that provide the greatest degree of tamper-evidency. In one embodiment, front and back panels 15 and 16 were both made of low density polyethylene film. One panel was tinted blue and one tinted green. The tamper-evident seal 42 was created by applying heat and pressure as if a seal strip (such as at 38) were being created, but with decreased temperature so that only a tack seal was created. As a result, tamper-evident seal 42 appeared yellow. Upon breaking tamper-evident seal 42 by pulling panels 15 and 16 apart, the yellowish colored line formerly at 42 disappeared and the panels reverted to their blue and green tint. Manually squeezing the panels back together at the area of former line 42 will not re-create the tamper-evident seal 42, nor reproduce the yellow line. The same result was also achieved using linear low density polyethylene for panels 15 and 16.

While the invention has been illustrated and described in detail in the drawings and foregoing description, the same is to be considered as illustrated and not restrictive in character, it being understood that only the preferred embodiment has been shown and described and that all changes and modifications that come within the spirit of the invention are desired to be protected.

What is claimed is:

1. A method for dispensing a liquid beverage, comprising the steps:

providing a container having a top and a bottom and defining a first opening at the top and a second opening proximal the bottom;

providing a beverage dispensing bag including a flexible pouch having a top, a top edge, a bottom, first and second panels and a width and wherein the first and second panels define a first opening at the bag top and wherein said at least one of the first and second panels defines a second opening near the bag bottom, and wherein said bag further includes liquid dispensing means including a tube connected to said pouch to permit a controlled flow of liquid from the second opening of said pouch, and wherein the first and second panels are permanently bonded together proximal the top of said pouch to close the first pouch opening and are connected together proximal the bag top to releasably close the first pouch opening, and wherein the pouch has a perforation line extending across at least a majority of the width of the pouch to define a tear strip between the perforation line and the top edge of the pouch, opening the first pouch opening by at least substantially tearing off the tear strip and substantially separating the first and second panels from each other at the top of the pouch;

positioning the bag into the container with the tube extending out through the second opening of the container;

inserting a liquid beverage through the first pouch opening and into the pouch; and, operating the liquid dispensing means by pulling the tear strip away from pouch to selectively release the liquid beverage out through the tube.

2. The method for dispensing a liquid beverage of claim 1 wherein said providing a beverage dispensing bag step includes the first and second panels being tack sealed together proximal the top edge and below the perforation line, and said method further includes manually pulling the first and second panels apart to break the tack seal.

3. The method for dispensing a liquid beverage of claim 1 wherein said providing a beverage dispensing bag step includes the liquid dispensing means including valve means engageable with the tube to selectively open and close liquid flow through the tube.

4. The method for dispensing a liquid beverage of claim 3 wherein said providing a beverage dispensing bag step includes the valve means being mounted to the container at the second container opening.

5. The method for dispensing a liquid beverage of claim 3 wherein said providing a beverage dispensing bag step includes the valve means defining a central opening and said positioning step includes extending the tube through the central opening.

6. The method for dispensing a liquid beverage of claim 3 wherein said providing a beverage dispensing bag step includes the valve means being separate from the container and operable upon engagement with a tube to keep the tube pinched closed unless actuated to unpinch the tube and permit liquid flow therethrough.

7. The method for dispensing a liquid beverage of claim 6 further including engaging the valve means with the tube to pinch closed the tube.

8. The method for dispensing a liquid beverage of claim 7 wherein said operating step includes actuating the valve means to unpinch the tube.

9. The method for dispensing a liquid beverage of claim 1 wherein said providing a beverage dispensing bag step includes the tube having a distal end that is removably closed and said method including opening the closed tube end before the operating step.

10. The method for dispensing a liquid beverage of claim 9 wherein said providing a beverage dispensing bag step includes the distal end of the tube having an opening and the tube including a plug removably plugging the distal opening, and wherein said method further includes removing the plug to open the tube end before performing the operating step.

11. A method for dispensing a liquid beverage, comprising the steps of:
provide a container having a top and a bottom and defining a first opening at the top and a second opening proximal the bottom;
providing a beverage dispensing bag including a flexible pouch having a top, a top edge, a bottom, first and second panels and a width and wherein the first and second panels define a first opening at the bag top and wherein at least one of the first and second panels defines a second opening near the bag bottom, and wherein said bag further includes liquid dispensing means including a tube connected to said pouch to permit a controlled flow of liquid from the second opening of said pouch, and wherein the first and second panels are permanently bonded together proximal the top of said poach to close the first pouch opening and are connected together at the bag top to releasably close the first pouch opening, and wherein the pouch has a perforation line extending across at least a majority of the width of the pouch to define a tear strip between the perforation line and the top edge of the pouch and includes the pouch having a closed condition with the tear strip connected to the first and second panels and the first pouch opening being closed, and an open condition with the tear strip torn away from the first and second panels and the first pouch opening being open;
opening the first pouch opening by at least substantially tearing off the tear strip and substantially separating the first and second panels from each other at the top of the pouch;
positioning the bag into the container with the tube extending out through the second opening of the container;
inserting a liquid beverage through the first pouch opening and into the pouch; and,
operating the liquid dispensing means to selectively release the liquid beverage out through the tube.

12. A method for dispensing a liquid beverage, comprising the steps of:
providing a container having a top and a bottom and defining a first opening at the top and a second opening proximal the bottom;
providing a beverage dispensing bag including a flexible pouch having a top, a top edge, a bottom, first and second panels and a width and wherein the first and second panels define a first opening at the bag top and wherein at least one of the first and second panels defines a second opening near the bag bottom, and wherein said bag further includes liquid dispensing means including a tube connected to said pouch to permit a controlled flow of liquid from the second opening of said pouch, and wherein the first and second panels are permanently bonded together proximal the top of said pouch to close the first pouch opening and are connected together proximal the bag top to releasably close the first pouch opening, and wherein the pouch has a perforation line extending across at least a majority of the width of the pouch to define a tear strip between the perforation line and the top edge of the pouch and has the first and second panels being tack sealed together proximal the top edge and below the perforation line and includes said pouch having a closed condition with the tear strip connected to the first and second panels and the first pouch opening being closed, and an open condition with the tear strip torn away from the first and second panels and the tack seal being broken and the first and second panels separated from one another to open the first pouch opening;
opening the first pouch opening by at least substantially tearing off the tear strip and substantially separating the first and second panels from each other at the top of the pouch;
positioning the bag into the container with the tube extending out through the second opening of the container;
inserting a liquid beverage through the first pouch opening and into the pouch; and,
operating the liquid dispensing means to selectively release the liquid beverage out through the tube.

13. A method for dispensing a liquid beverage, comprising the steps of:
providing a container having a top and a bottom and defining a first opening at the top and a second opening proximal the bottom;
providing a beverage dispensing bag including a flexible pouch having a top, a top edge, a bottom, first and second panels and a width and wherein the first and second panels define a first opening at the bag top and wherein at least one of the first and second panels defines a second opening near the bag bottom, and wherein said bag further includes liquid dispensing means including a tube connected to said pouch to permit a controlled flow of liquid from the second opening of said pouch, and wherein the first and second panels are connected together by a tack seal along a line proximal the top edge to releasably close the first pouch opening at the bag top to releasably close the first pouch opening;
opening the first pouch opening by manually pulling and substantially separating the first and second panels from each other at the top of the pouch;
positioning the bag into the container with the tube extending out through the second opening of the container;
inserting a liquid beverage through the first pouch opening and into the pouch;
operating the liquid dispensing means to selectively release the liquid beverage out through the tube; and,
wherein said providing a beverage dispensing bag step includes the first panel being tinted a first color and the second panel being tinted a second color and the unbroken tack seal line appearing as a third color, and wherein when the tack seal has been broken, the tack seal line no longer appears as the third color at broken points on the tack seal line.

14. A method for dispensing a liquid, comprising the steps of:
  providing a container having a top, a bottom, a first opening at the top and a second opening proximal the bottom;
  providing a liquid dispensing bag including a flexible pouch having a top, a bottom, and first and second panels, wherein the first and second panels define an interior and a first opening to the interior at the bag top, wherein at least one of the first and second panels defines a second opening to the interior near the bag bottom, and wherein said bag further includes liquid dispensing means including a tube connected to said pouch to permit a controlled flow of liquid from the second opening of said pouch, and wherein the first and second panels are connected together at the pouch top to releasably close the first pouch opening and wherein the bag contains a beverage concentrate;
  opening the first pouch opening by separating the first and second panels from each other at the top of the pouch;
  positioning the bag into the container with the tube extending out through the second opening of the container;
  inserting liquid into the bag interior by admixing water to the bag interior; and,
  operating the liquid dispensing means to selectively release the liquid beverage out through the tube.

15. The method for dispensing a liquid of claim 14 wherein said providing a liquid dispensing bag stop includes the first and second panels being tack sealed together along a line proximal the bag top to releasably close the first pouch opening, and wherein the opening step includes manually pulling the first and second panels apart.

16. The method for dispensing a liquid of claim 14 wherein said providing a liquid dispensing bag step includes the first and second panels being permanently bonded together proximal the top of said pouch to close the first pouch opening.

17. The method for dispensing a liquid of claim 14 wherein said providing a liquid dispensing bag step includes the pouch having a width, a top edge and a perforation line extending across at least a majority of the width to define a tear strip between the perforation line and the top edge of the pouch, and wherein said opening step includes pulling the tear strip away from pouch.

* * * * *